Figure 1:
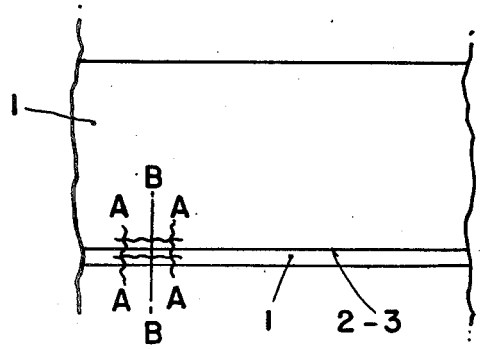

Dec. 26, 1950   J. A. SOURWINE   2,535,100

PROCESS FOR PRESTRESSING CEMENT PRODUCTS

Filed Jan. 17, 1949

Showing debonding of metal rod in cement body.

Rod with coating partially removed.

Rod with coating substantially removed.

James A. Sourwine
Inventor

Patented Dec. 26, 1950

2,535,100

UNITED STATES PATENT OFFICE 2,535,100

PROCESS FOR PRESTRESSING CEMENT PRODUCTS

James A. Sourwine, Washington, D. C.

Application January 17, 1949, Serial No. 71,401

7 Claims. (Cl. 25—154)

This invention has for its purpose the development of a new method for prestressing various types of cement products.

The invention comprises the placement and hardening of a mixture of cement and of dry mineral aggregate, which has been wetted with the non-aqueous organic liquid methyl-benzene, which wetted mixture has had placed within it before hardening, a system of metal reinforcement consisting of steel or other metal rods or wires of uniform cross-section, which rods or wires have been coated before placement, with a thin surface coating of a plastic substance soluble in methyl-benzene. The wetted mixture, comprising cement and mineral aggregate wetted with the organic solvent methyl-benzene, acts during hardening to slowly dissolve the surface coating from the surface of the steel or other reinforcement. The result is the formation of a hardened mass of artificial stone, which contains within it after hardening, a system of close-fitting steel or other reinforcement comprising rods or wires of uniform cross-section, which rods or wires are not surface-bonded to the surrounding stone mass, but are free to move in a lengthwise direction within the hardened stone, and to be lengthened and brought under tensile stress, through the application of external force. These steel or other metal rods or wires I proceed to lengthen and to place under tensile stress, through an external pulling force applied to one end or to both ends of each rod or wire. I then securely fasten or tie each end of the rod or wire to the end surface or end section of the given unit of hardened cement product stone.

The words "methyl-benzene" and "methyl-benzene liquid," as used in this specification and in the attached claims, are herewith defined to comprise toluol and xylol and diluents of either of these liquids with other suitable organic liquids. The words "toluol" and "toluol liquid" are defined to comprise either undiluted toluol or toluol diluted with other suitable organic liquids. The words "xylol" and "xylol liquid" are defined to comprise either undiluted xylol or xylol diluted with other suitable organic liquids. The words "methyl-benzene soluble plastic coating material," as used in this specification, are herewith defined to comprise substances such as resinous, waxy, and other plastic materials which are capable of being placed or molded into the form of a thin coating over a metal rod and which after having been so placed are capable of being dissolved at least in part by the methyl-benzene present as a mixing liquid, within a methyl-benzene wetted cement product, when said coated rods are left embedded therein. The amount of coating removed by the methyl-benzene liquid during the short period required for initial set in the cement body is of inconsequential quantity, but during the continued hardening and maturing of the cement body, the methyl-benzene present as a wetting liquid in the said cement body, acts in solvent capacity to such degree, that the methyl-benzene soluble coating over each rod is during such period at least in part removed, in such manner as to break and completely destroy the surface bond between the metal reinforcing rod and the surrounding stone. The at least partial removal of the said coating as above described, leaves a thin separator space between the metal rod and the surrounding stone, said separator space being of such thinness as to inhibit the entrance of water, thus protecting the metal rod against deterioration due to rust or to weathering, while at the same time breaking all surface bond between the metal rod and the surrounding stone. The breaking of the surface bond between each said metal rod and the surrounding stone, as a preparatory step towards prestressment, is achieved automatically by the solvent action of the methyl-benzene already present as a mixing liquid, within the hardening cement product stone.

Figure 2:
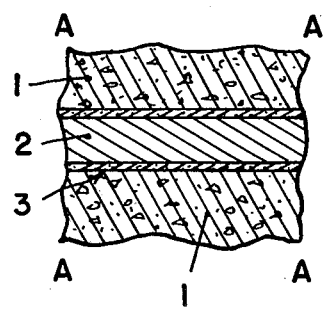
Figure 3:
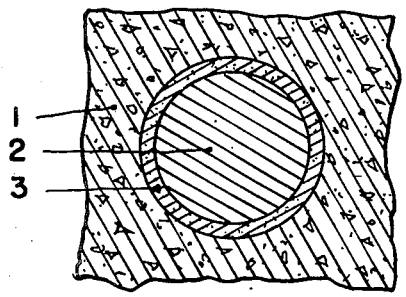
Figure 4:
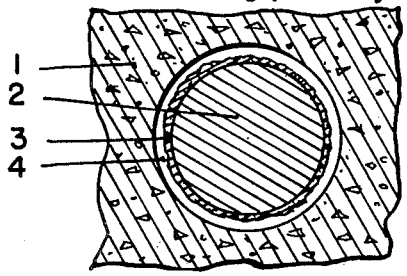
Figure 5:
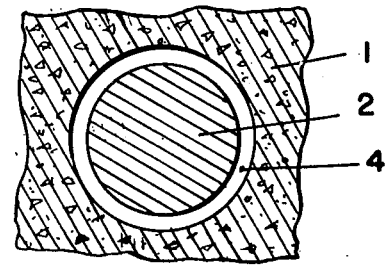

The accompanying drawing illustrates the debonding of a coated metal rod in a methyl-benzene mixed cement body. Fig. 1 shows an elevation of a section of beam, comprising cement body 1 with coated rod 2—3 embedded in same. Fig. 2 is an enlarged fragmentary view in elevation, of small beam section in area AAAA (as marked on Fig. 1), with metal rod 2 and coating 3, embedded in cement body 1. Fig. 3 shows an enlarged cross-sectional view along plane BB (as marked on Fig. 1), with rod 2 and coating 3 embedded in cement body 1. Fig. 4 shows an enlarged cross-sectional view along plane BB, with rod 2, and with coating 3 partly removed, forming separator space 4 between rod 2 and cement body 1. Fig. 5 shows an enlarged cross-sectional view along plane BB, with rod 2, and with coating substantially removed, forming separator space 4 between rod 2 and cement body 1.

Various methods of stressment may be employed to accomplish the bringing of the metal reinforcement units under a condition of tensile stress. As an illustration and describing one method of application of my external pulling force, I fasten securely one end of the rod or wire by a metal distributing plate or bearing plate or other mechanical device, to one end surface or end section of the hardened stone unit, following which I grip the other end of the rod or wire with a mechanical device, and apply the pressure of a hydraulic jack against the end of the hardened stone unit, to exert a pulling force upon the gripped rod or wire, using the hardened stone unit as a compression block against which my external force is applied, the hardened stone serving thus as the resistant mass against which the stress in the metal reinforcement is developed, while at the same time by the increased tensile stress which I develop in the metal reinforcement, there is produced a reciprocal compressive stress in the hardened cement product stone unit. By then tying and securing each lengthened and prestressed metal reinforcing unit in such manner as to provide a secure band between the end sections of the metal rods or wires and the end-sections of the hardened stone unit, I assure the continuance of the prestressed condition of the hardened stone, and I establish and maintain a condition of reciprocal prestress between the tensile-stressed metal reinforcement and the compressive-stressed hardened stone.

Design details for the achieving of the prestressment and for mechanical attachment of the ends of the steel or other reinforcement units to the end surfaces or end sections of the hardened stone unit, may be worked out at the discretion of the designing engineer. One method used by me, consists of the employment of a metal distributing plate or bearing plate at each end of the hardened stone unit. My steel or other metal rods or wires pass through this plate and are attached to its outer surface, by welding or bolting or other mechanical device. The metal distributing plate is designed so as to provide an even bearing against the end surface of the hardened stone unit.

In one method of manufacture as employed by me, I use one metal distributing plate at one end of the stone unit, and two metal distributing plates at the other end. The reinforcing rod or wires are each attached securely to the single distributing plate at the one end and this is fitted up closely to the stone unit, so as to serve as a bearing plate. The rods or wires pass freely through holes constructed for that purpose, in one of the distributing plates at the other end of the stone unit, this plate being fitted up closely to the end of the stone unit and acting as a bearing plate against same, the reinforcing rod or wires continuing on to pass through another distributing plate and to be firmly secured on or along the outer surface of same. This third distributing plate as used by me for this method of manufacture, is parallel to but separated from the second distributing plate or bearing plate, and the space between these two plates is not immediately filled with my cement product stone, but the two plates are held apart by a temporary metal frame which holds the second plate or bearing plate firmly against the end of the stone unit, while hardening of that stone unit is taking place. Following the hardening of the stone unit, I apply a battery of two or more hydraulic jacks, operating between the two steel plates, to obtain in a very short period the prestress of both reinforcing steel and the reciprocal prestress of the hardened artificial stone. I then set in chuck blocks of steel to hold apart the two plates and to maintain the prestress in the stone unit, following which I remove the hydraulic jacks and fill around the steel chuck blocks with artificial stone, and allow this to harden into position.

In another still modified method of manufacture, I use two special steel frames to act as temporary stress blocks, in place of the chuck blocks, as above described.. These steel frames are built in position outside of the deferred section requiring to be filled with artificial stone, and after the placement and hardening of the artificial stone, the steel frames are detached and removed from position, thus placing the deferredly built and hardened short section of artificial stone under the same prestress with the main section of the unit as previously constructed.

The use of a couple of small mechanical jacks as added temporary equipment, along with the procedure and equipment last above described, makes feasible the placement of a small initial tensile stress upon the metal reinforcement units in place, sufficient to act as a tautening device and to remove any possible sag in case small diameter wires be used as reinforcement. In this special case there will be required also a light anchor of some form at each end of the planned artificial stone unit, sufficient to support the initial tautening stress, and to avoid placing the tautening stress upon the new and unhardened toluol-mixed cement product. All of the above described details of manufacture are intended as informational and optional only, and are not intended to in any way limit the details of constructional procedure which shall be used. I find a variety of suitable safe mechanical devices for gripping and holding securely the prestressed steel rods or wires, by means of which bond is made to the distributing plates.

The artificial stone used in this process is one of several products described by me in the specification of U. S. Patent No. 2,238,540, patented April 15, 1941. The method of developing a prestressed artificial stone, as herein outlined and described, is new and unique in the art of making cement products, being based upon the unusual solvent property of the liquid with which the cement and aggregate are mixed. Other metals than steel may be used as reinforcement, notably wires made of magnesium or alloys of magnesium or alloys of magnesium and aluminum and other metals. Water does not possess the solvent action required to dissolve a methyl-benzene soluble coating, and for water mixed cement products this present invention is not applicable or suitable for use.

The word "cement" as used in this specification and in the appended claims, includes all types and brands of standard Portland cement and natural cement, or blends and admixtures of same. Also all brands of high test cement, white cement and lumnite cement, including also any blends or admixtures of these one with the other, or with Portland cement or natural cement. The words "rods or wires of uniform cross-section" as herein used, are intended to specify a standard rod or wire or assembly of rods or wires, without lugs or cross-sectional protuberances, the cross-section of which is approximately uniform, to such degree as shall be readily and commercially feasible, in the process of manufacture.

The new process by which I develop and manufacture a prestressed cement product stone, produces a group of new products which serve a wide variety of use in construction work. It is available for forming precast units of artificial stone in various shapes and forms, which units are suitable for numerous construction uses, including arch ribs, girders, beams, slabs and other units. It is also suitable for constructing in place large units of prestressed hardened stone, including retaining walls, dams, dam segments, and long slabs for use in flooring or paving.

It is noted that due to various unusual and superior physical properties possessed by the unreinforced methyl-benzene mixed cement product body, we have available in the unhardened methyl-benzene mixed cement product mass, superior facilities for the formation of a new and highly efficient type of prestressed reinforced cement product, and that we obtain thru the use of this new process of prestressment, a group of products constituting a new type of highly superior prestressed reinforced artificial stone. Several superior and useful physical properties, present in a measure in the unreinforced methyl-benzene mixed cement products, are definitely enhanced by the process of prestressment to such degree as to become for practical uses entirely new physical properties and additive superior physical properties are achieved, with the result that the prestressment herewith accomplished, becomes actually more than merely a new method of prestressment, and achieves an entirely new and superior type of cement product. Through the simple and inexpensive additive procedure as herein described, there is developed for commercial use in any methyl-benzene mixed cement product, and this achievement without unreasonable expenditure of additive labor and within a reasonable time period for construction, a new group of construction units and materials, which are highly superior in their physical properties and which provide exceptionally strong and durable units for construction work. Some of the unusual physical properties in the new prestressed reinforced material are (1) a low water absorption minimized to such degree as to become water repellant; (2) an unusually high resistance to surface abrasion; (3) a very high unit compressive strength; (4) the development of engineering construction units which have the capacity to resist tensional and bending stress as well as compressive stress; (5) a superior resistance to weathering and to warp, under varying conditions of exposure to moisture, and to temperature change. These several properties, some of them characteristic in a measure of the unreinforced methyl-benzene mixed cement products, are markedly augmented and enhanced by the method of prestressed reinforcement, which results in a new and improved prestressed reinforced cement product, there being formed in this manner a new engineering material which is capable of unusual use and service, for which the non-reinforced and non-prestressed methyl-benzene mixed cement product would not be either adequate or sufficient. The unusually favorable facilities made available in the unhardened methyl-benzene mixed materials, as developed and taken advantage of, by the simple and practical method of prestressment herein described, result in the forming and constituting of a new and superior construction material, which will resist tension and bending stress as well as compressive stress. Material suitable for a variety of construction uses, and unusually qualified to resist both stress and weathering, and to endure with a low rate of depreciation and with maintained high quality, over a long period of time. It is noted also that the method employed is simple in operation, and requires practicaly no additive labor or extended period of time. The manufacture of the new type of prestressed reinforced stone is commercially sound and practicable, and has the capacity of being readily fitted into the routine of large scale production as frequently required in modern industrial work, thus serving to form and constitute a new and highly efficient modern construction method, which opens new fields of use and offers increased possibilities in cement product construction.

I claim:

1. A method for making a prestressed metal-reinforced cement product unit of methyl-benzene cementitious mix, comprising precoating the metal reinforcement units with a coating material which is slowly soluble in the liquid constituent of the cement product mix, whereby the surface bond between each metal reinforcement unit and the cement body will be destroyed during the hardening of said cement body, allowing said cement mix to harden, prestressing in tension the debonded metal reinforcement units after the said cement body has hardened into unit form, and prestressing in compression the said hardened cement body, thereafter securing the ends of the several prestressed metal reinforcement units to the said hardened cement body unit.

2. A method for making a prestressed metal-reinforced cement product unit comprising applying to each reinforcing rod prior to its embedment in a mixture of cement and aggregate and methyl-benzene liquid, a thin coating of a plastic material which is slowly soluble in the liquid constituent of the cement product mix, whereby as a result of the slowly dissolving action of said liquid constituent on said coating material, the surface bond between each reinforcing unit and the surrounding cement body will be destroyed during the hardening of said cement body, thereafter applying a tensile force to each said debonded reinforcing unit, using the said hardened cement body as a compression block against which said tensile force is applied, thus achieving at one and the same time a prestressment in tension of metal reinforcement units and a prestressment in compression of the hardened cement body, and securing the ends of the metal reinforcing units prestressed in tension, to the said hardened cement body, prestressed in compression.

3. A method for prestressing a cement product, which comprises placing within a methyl-benzene wetted mixture of cement and aggregate, a system of high tensile strength metal reinforcing rods of uniform cross-section, each of which rods bears a thin coating of a methyl-benzene soluble plastic material, whereby the said plastic coating is acted upon and is dissolved in whole or in part by the methyl-benzene wetting liquid during the process of hardening of the wetted mixture of cement and aggregate, thus destroying the surface bond between each reinforcing rod and the surrounding hardened cement product while maintaining a snugly protective surface of hardened cement body fitting closely about the debonded surface of each reinforcing rod, then applying a tensile prestress to each said unbonded reinforcing rod, and a compressive prestress to the said hardened cement product, and securely fastening each said reinforcing rod, at each end of same, to the hardened cement product unit in which it is embedded.

4. A method for forming a prestressed cement product, comprising the preparing of a mixture of cement, aggregate, and liquid methyl-benzene, and molding said mix around metal reinforcing rods which have been previously coated with a plastic material which is slowly soluble in the liquid methyl-benzene, whereby the said plastic coating will be slowly dissolved as the said cement mix hardens, thus releasing all surface bond between the reinforcing rods and the surrounding hardened cement product, then prestressing in tension each reinforcing rod and in compression the said hardened unit of cement product, following which each reinforcing rod is securely fastened at its ends to the hardened cement product unit.

5. A method for forming a prestressed cement product, comprising the preparing of a mixture of cement, aggregate and toluol liquid, and molding said mix around metal reinforcing rods which have been previously coated with a plastic material which is slowly soluble in the toluol liquid, whereby the said plastic coating will be slowly dissolved as the said cement mix hardens, thus releasing all surface bond between the reinforcing rods and the surrounding hardened cement product, then prestressing in tension each reinforcing rod and in compression the said hardened unit of cement product, following which each reinforcing rod is securely fastened at its ends to the hardened cement product unit.

6. A method for forming a prestressed cement product, comprising the preparing of a mixture of cement, aggregate and xylol liquid, and molding said mix around metal reinforcing rods which have been previously coated with a plastic material which is slowly soluble in xylol liquid, whereby the said plastic coating will be slowly dissolved as the said cement mix hardens, thus releasing all surface bond between the reinforcing rods and the surrounding hardened cement product, then prestressing in tension each reinforcing rod and in compression the said hardened unit of cement product, following which each reinforcing rod is securely fastened at its ends to the hardened cement product unit.

7. A method for producing a prestressed cement product, comprising (a) placing within a methyl-benzene wetted mixture of cement and dry mineral aggregate, a system of high tensile strength metal rods of uniform cross-section, the surface of which rods has been treated prior to placement within the wetted cement mixture with a thin coating of a methyl-benzene soluble material; (b) allowing the said coated metal rods to remain embedded in the methyl-benzene wetted mixture for a sufficient period that the methyl-benzene will act on the coating of the metal rods to at least partly dissolve and remove said coating during the said period of embedment of rods and of hardening of said cement mixture into a unit mass; (c) prestressing in tension the said metal rods left unbonded by the removal of coating, using the said hardened cement unit as a compression block to develop the stress by which the tensile prestress of the said metal rods is achieved; (d) tieing securely the ends of the prestressed metal rods to the end sections of the said hardened cement unit through the use of a metal distributing plate, in this manner distributing the compressive stress throughout the hardened cement product unit, and maintaining a condition of reciprocal prestress between the said high tensile strength metal rods prestressed in tension and the said hardened cement product unit prestressed in compression.

JAMES A. SOURWINE.

REFERENCES CITED

The following references are of record in the file of this patent:

UNITED STATES PATENTS

| Number | Name | Date |
|---|---|---|
| 1,684,663 | Dill | Sept. 18, 1928 |
| 2,238,540 | Sourwine | Apr. 15, 1941 |
| 2,413,990 | Muntz | Jan. 7, 1947 |